United States Patent

Armstrong, III

[11] Patent Number: 5,845,934
[45] Date of Patent: Dec. 8, 1998

[54] VEHICLE SAFETY RESTRAINT SYSTEM

[75] Inventor: C. Wallace Armstrong, III, Huntsville, Utah

[73] Assignee: Morton International, Inc., Chicago, Ill.

[21] Appl. No.: 822,929

[22] Filed: Mar. 21, 1997

[51] Int. Cl.$^6$ .................................................. B60R 21/26
[52] U.S. Cl. ........................ 280/742; 280/741; 280/736
[58] Field of Search .................................... 280/736, 741, 280/742

[56] References Cited

U.S. PATENT DOCUMENTS

| | | | |
|---|---|---|---|
| 1,758,881 | 5/1930 | Birkholz | 55/527 |
| 3,505,038 | 4/1970 | Luksch et al. | 29/183.5 |
| 4,251,238 | 2/1981 | Claes et al. | 55/97 |
| 4,655,797 | 4/1987 | Iniotakis et al. | 55/16 |
| 5,028,070 | 7/1991 | Bender | 280/742 |
| 5,179,061 | 1/1993 | Haerle | 502/339 |
| 5,266,279 | 11/1993 | Haerle | 422/177 |
| 5,378,015 | 1/1995 | Rink et al. | 280/742 |
| 5,665,131 | 9/1997 | Hock et al. | 280/742 |
| 5,727,813 | 3/1998 | Stratton et al. | 280/742 |

*Primary Examiner*—Kenneth R. Rice
*Attorney, Agent, or Firm*—George W. Rauchfuss, Jr.

[57] ABSTRACT

In a pyrotechnic or hybrid inflator the combustion gas on its way to inflate the cushion is filtered through at least one layer of wire mesh in which the metal wire mesh is composed of wire having mechanically enhanced surface area. In particular, the strands of wire of the wire mesh is formed with and irregular, roughened peripheral surfaces.

6 Claims, 2 Drawing Sheets

VEHICLE SAFETY RESTRAINT SYSTEM

FIELD OF THE INVENTION

This invention relates to vehicle safety restraint systems such as airbags inflated by a hybrid or pyrotechnic inflator. More specifically, the invention relates to the improvement in such systems of a filter comprising a woven metal wire mat or cloth formed of metal wire having a roughened peripheral surface for removing particulate material in the inflation gas generated in the inflator.

BACKGROUND OF THE INVENTION

Many types of inflators have been disclosed in the art for inflating an airbag for use in an inflatable restraint system. One type involves the utilization of a quantity of stored compressed gas which is selectively released to inflate the airbag. Another type derives a gas source from a combustible gas-generating or pyrotechnic material which, upon ignition, generates a quantity of gas sufficient to inflate the airbag. In a third type, the airbag inflating a gas results from the combination of a stored compressed gas and the combustion products of a gas generating material. The last mentioned type is commonly referred to as an augmented gas or hybrid inflator.

Hybrid or pyrotechnic inflators that have been proposed heretofore have, in general, been subject to certain disadvantages. For example, the burning of the pyrotechnic (gas generating) and initiation materials in such inflators can result in the production of hot particulate material. The use of such a hot particulate-containing inflator emission to inflate an airbag can in turn result in the hot particulate material burning the airbag fabric or even being vented out from the airbag and into the vehicle.

Typically, the particulate material is variously sized and can include a large amount of particulate within the respirable range for humans. Thus, the passage of the gas-borne particulate material into the passenger compartment of the vehicle, such as via conventional airbag venting, could result in the undesired respiration of such particulate material by the driver and/or other passengers which in turn could cause consequent respiratory problems. Also, such particulate can easily become dispersed and airborne so as to appear as robe-smoke and thereby result in the false impression that there is a fire in or about the vehicle.

It has also been proposed to screen the gaseous emission coming from pyrotechnic inflators or the pyrotechnic portion of such hybrid inflators. For example, in U.S. Pat. No. 5,551,724 issued Sep. 3, 1996 and assigned to Morton International, Inc., there is disclosed the use of a layer or layers of expanded metal mesh for screening the discharge of the exhaust gas of a hybrid inflator. The invention is indeed meritorious.

In addition and as described above, inflators, particularly those which house a combustible gas-generating material, whether alone or in conjunction with a stored gas as in hybrid inflators, have in the past utilized various grades of fine metal screens or mesh to effect emission filtration. As typical samples of such woven wire mesh or screen that have been used in the past, there may be mentioned, for example, woven stainless steel wire such as by National Standard Co. and typically having an open area in the range of about 20 to 60 percent, such as a fine wire screen such as a single wrap of 45×170 mesh stainless steel Dutch weave or two to three wraps of 30×30, 50×50, or 100×100 mesh stainless steel screen.

The treatment of the exhaust gas with such conventional metal mesh or screen has been found lacking in that such woven wire screens have not been entirely effective in filtering out all particles. The woven wire mesh typically used in inflator filter members comprises wire material drawn and annealed to precise diameters and then woven on a loom. It has now been discovered, in the present invention, that lack of filtering effectiveness is, at least in part, due to the lack of sufficient surface area being presented to the particulate matter by the smooth diameter strands of wire of the wire mesh screens to cause the particulate matter to coalesce and adhere to the wire.

There has thus been a need to enhance the effectiveness of wire mat or cloth or mesh or screen (terms herein used interchangeably) in the filtration of solid particles in the exhaust or inflation gas from a pyrotechnic or hybrid inflator in an airbag safety restraint system. The present invention addresses this need.

SUMMARY OF THE INVENTION

The invention comprehends an improved inflator for use in an inflatable vehicular safety restraint system wherein the inflator has a combustion chamber where a gas generant material is burned to generate a gas for use in inflation of an inflatable vehicle occupant restraint. In general, such generated gas contains particulates of the gas-generating material and by-products thereof.

In accordance with the invention, the inflator includes filter means defined by at least one layer of wire mesh. The wire mesh is composed of wire having enhanced surface area. In particular, the outer peripheral surface of the wire mesh is physically altered to have an irregular, roughened peripheral surface. Such a surface may be pitted, grooved, mangled, or otherwise deformed. Production of the irregular roughened peripheral surface on the wire mesh may be accomplished by any suitable physical means, such as for example, by abrading, sand/bead blasting, calendering, coining or knurling the mesh.

BRIEF DESCRIPTION OF THE DRAWINGS

Other objects and features of the invention will be apparent to those skilled in the art from the following detailed description taken in conjunction with the appended claims and drawings, all of which disclose a non-limiting embodiment of the invention. In the drawings:

DESCRIPTION OF THE PREFERRED EMBODIMENT

Although the invention will be explained and illustrated by reference to two specific inflator constructions, it will be appreciated that the inflator of this invention can be any suitable pyrotechnic or hybrid inflator of a myriad of various constructions.

Figure 1:
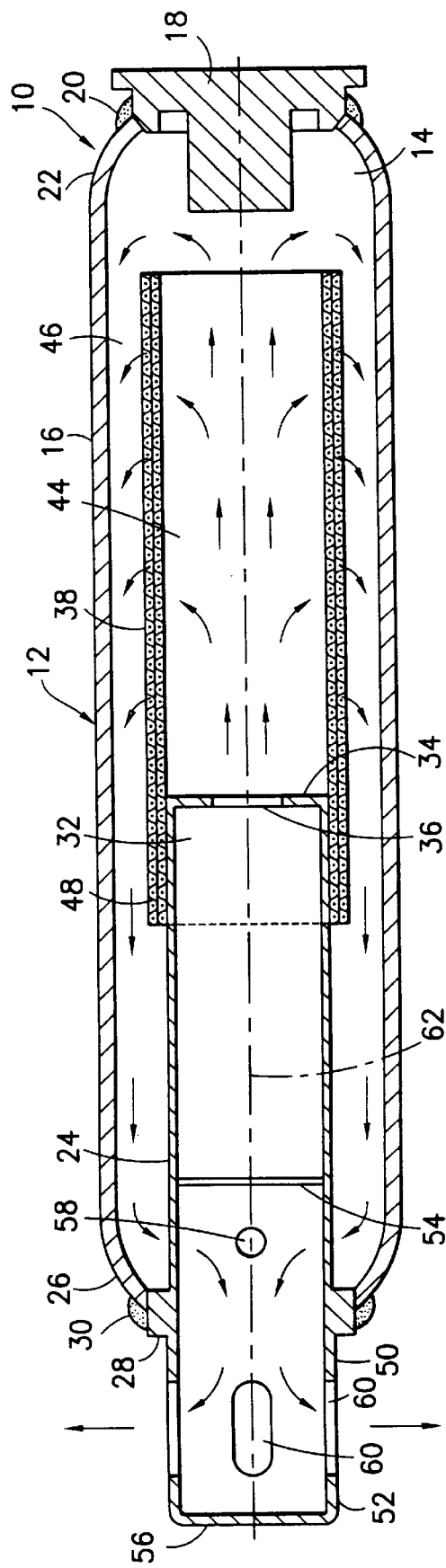
FIG. 1 is a sectional view of an inflator embodying the invention. It is an example of one type of passenger-side airbag inflator.

In FIG. 1, a hybrid inflator assembly is shown, generally designated 10. It is suitable for use in inflating a vehicle inflatable restraint cushion of the passenger side of a vehicle. The inflator assembly 10 includes an elongated, generally cylindrically shaped pressure vessel or container 12.

The container 12 includes a storage chamber 14 useful in effecting gas redirection and for use in storing a supply of gas under pressure.

The chamber 14 is defined by an elongated cylindrical sleeve 16. An end plug 18 is attached by means of a circumferential weld 20 in sealing relation to a first end 22 of the sleeve 16. The end plug 18 includes a passage (not shown) through which the gas to be stored can be conducted into the chamber 14. Once the chamber 14 has been filled with gas at the desired pressure, the passage is closed.

A gas generator housing 24 is recessed in sealing relation into the chamber 14 from a second end 26 of the sleeve 16, with a collar 28 about the mid-section of the gas generator housing 24 being attached by means of a circumferential weld 30 with the sleeve 16.

The chamber 14 is used in storing therein a supply of gas-generating material, which, for example, may be in the form of tablets, pellets, wafer, granules or the like.

The housing 24 includes an end portion 32 forming an inner end 34 having a central opening or gas exit nozzle orifice 36 through which hot gas generated upon ignition of the gas-generating material is released into the chamber 14.

Housed in the container 12 and extending into the chamber 14 about said gas exit nozzle orifice 36 of the housing 24 is a structure 38 composed of a filter material. The filter structure 38 is generally cylindrical tubular in shape and extends from the gas generator housing 24 towards the end plug 18. The filter structure 38 defines within the chamber 14 both an inner and an outer mixing zone, respectively designated by the reference numerals 44 and 46. A first end portion 48 of the filter structure 38 is spot welded to the gas generator 24, such as about the end portion 32. It will be understood that other means of appropriately positioning and placing the filter structure 38 within the inflator assembly 10 can, if desired, be utilized without departing from the subject of the invention.

Figure 4:
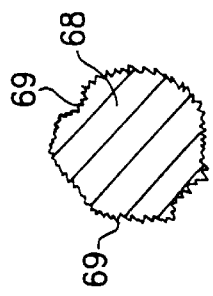
FIG. 4 is a greatly enlarged sectional view taken on the line 4—4 of FIG. 3.
Figure 3:
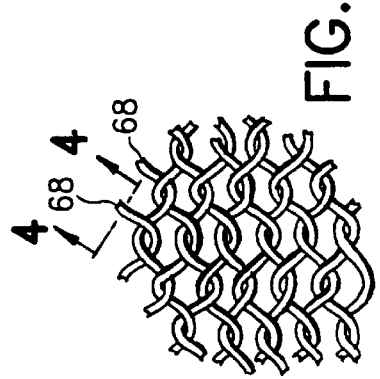
FIG. 3 is a greatly enlarged fragmentary view of the wire mesh filter used in inflators embodying the invention.

Reference is now made to FIGS. 3 and 4 wherein the wire mesh of filter structure 38 is shown in greater detail. As fully described in the above-mentioned U.S. Pat. No. 5,551,724, incorporated herein by reference thereto, the filter structure 38 may be in the form of a laminate comprising woven strands 68 wire mesh on the outside or inside with a layer inbetween such as ceramic paper or textile. The woven wire mesh may be as shown in FIG. 3. The woven wire mesh of this invention may be any suitable woven wire mesh such as the woven metal wire mesh previously mentioned as being available from National Standard Co., but wherein such woven wire mesh has had the strands 68 thereof mechanically roughened to provide an irregular peripheral or circumferential surface 69 on the strands to greatly increase the surface area thereof. Although the woven wire mesh will generally have a mesh size of from about 5×5 to 100×100, the mesh size is preferably from about 10×10 to about 50×50 mesh.

In the embodiment illustrated in FIG. 1 the gas-generator housing 24 includes an inflator diffuser 50 adjacent to and which may be integral with the pyrotechnic chamber 24. That is, the diffuser 50 comprises a generally cylindrical sleeve 52 that is joined at a first end 54 to the pyrotechnic storage chamber 24. An opposite second end 56 of the diffuser 50 extends external the container 12. Generally equally spaced controlling orifices 58 are positioned about the cylindrical sleeve 52 adjacent the first end 54. The controlling orifices 58 provide passage into the diffuser 50 of inflation gas from the container 12. This inflation gas can then exit the inflator 10 by means of gas exit ports 60 spaced circumferentially around the diffuser 50 adjacent its second end 56.

Oval shaped gas exit ports 60 are generally equally spaced about the circumference of the diffuser end 50 so as to promote a more uniform distribution of the exiting gas about the circumference of the inflator assembly 10 and to desirably result in the assembly being thrust neutral.

In the illustrated embodiment, the gas exit nozzle orifice is generally situated in a fashion such that the nozzle orifice 36 is centered towards one end of the filter structure 38 along the central longitudinal axis 62 thereof. It will be appreciated that the gas initially exiting from the pyrotechnic chamber 24 through the gas exit nozzle orifice 36 will be initially generally directed through the inner mixing zone 44 of the filter structure 38 towards the end plug 18. Thus, upon exiting from the pyrotechnic housing 24, the generated gas will commingle with stored gas within the inner mixing zone 44.

Figure 2:
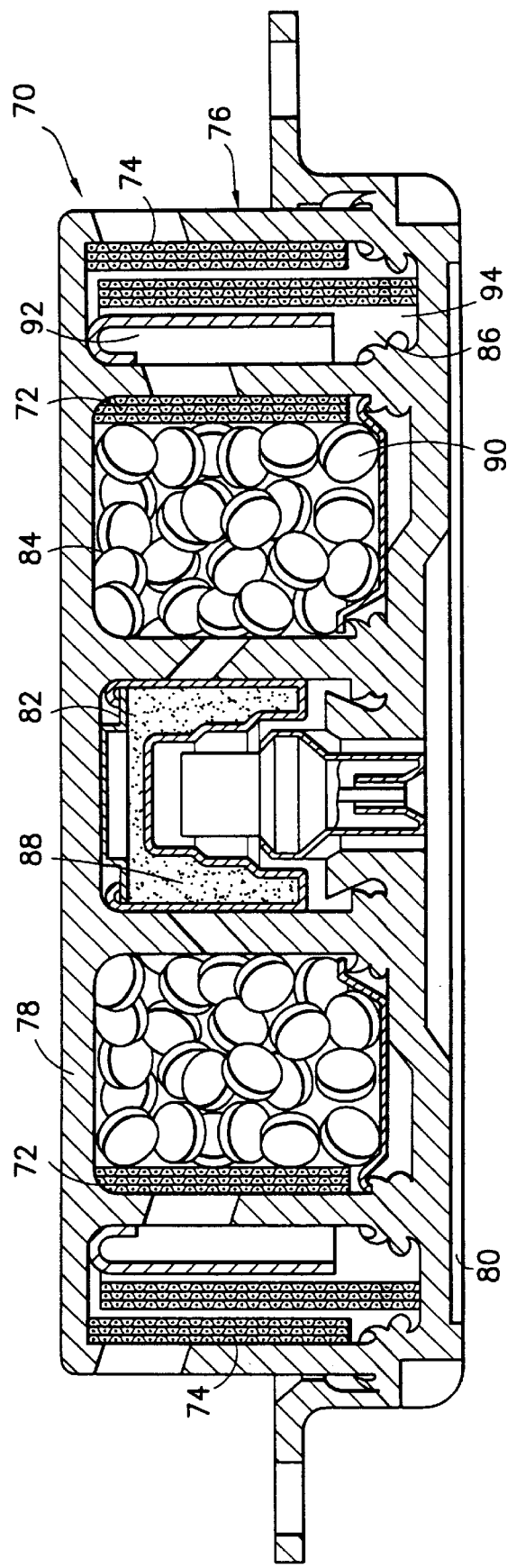
FIG. 2 is a sectional view of an inflator embodying the invention as would be an example of a driver-side airbag inflator.

FIG. 2 illustrates a driver-site vehicular safety restraint inflator assembly 70 illustrating the placement therein of first and second filter annular assemblies 72 and 74, respectively, each of which, in accordance with the invention, utilizes an improved wire mesh.

The inflator assembly 70 has a generally cylindrical external outline and includes a housing 76 comprising an upper shell 78 and a lower shell or base 80. Within the housing 76 is formed a cylindrical ignitor chamber 82, a combustion chamber 84 in the form of a toroid, and an outer chamber 86, also in the form of a toroid.

Within the ignitor chamber 82 is positioned an appropriate ignitor assembly 88, such as is known in the art. Contained within the toroidal combustion chamber 84 are pellets 90 of a selected gas-generant composition, such as is known in the art. The collection of gas-generant pellets 90 are surrounded by the first filter assembly 72, i.e. an annular pre-filter. As detailed below, and in accordance with the invention, the pre-filter 72 is formed of wire mesh.

In the outer toroidal chamber 86, an aluminum annular deflector ring 92 is provided. The length of the deflector ring 92 is such as to provide an annular exhaust opening or port 94 at the lower end of the ring 92.

Also included in the outer toroidal chamber 86 is the second filter assembly 74 composed of layers of improved wire mesh as detailed hereunder. The filter assembly may also include filter material such as nickel or stainless steel mat fibers or ceramic paper.

It will be appreciated that in such a driver-side inflator the first filter assembly 72 and the second filter assembly 74 are maintained physically separated from each other.

The wire mesh used in the layers of filter in the inflators embodying the invention has been mechanically treated to increase the surface area of the mesh. This causes the adherence and coalescing of any undesirable particles in the exhaust gas. An example of the mesh used, the wire mesh layers in the inflators above described (for instance, the layers of filter structure 38 in FIG. 1 and of the layers of filters 72 and 74 of FIG. 2) is shown in FIG. 3. It is a mesh of wire strands 68. The mesh of the filters under the invention can be knitted, braided or woven. The word "mesh" is used herein to include all such techniques.

Distinctive about the mesh under the invention is the irregularly roughened outer surface 69 of the strands 68 of the metal wire mesh to produce the aforesaid increased surface area. The roughened surface may be mechanically achieved by any number of different techniques. One of the techniques is to treat the smooth strands of the mesh with sand or beads by blasting the mesh strands once the mesh is made. This involves aiming at the mesh a forceful stream of sand or beads entrained in an air stream. As can be imagined, very small diameter beads will tend to dent the metal wire strands, creating deformities, with corresponding bulges raised on the side of the wire strands opposite the indents.

Another technique involves working a metal wire brush against the wire mesh. This technique has the disadvantage that it tends to reduce the amount of metal on the mesh, but even so, creates an improved filtering material with increased surface roughness.

Coining, that is, striking the mesh before assembly from opposite side with dies to raise irregular surface topography, is also effective, as is knurling or calendering of the wire, that is, running the wire strands in through the nip of tightly pressed-together configured rolls. All of these techniques produce the desired surface area increase by producing irregularly shaped circumferential surfaces, as shown in FIG. 4, on the strands 68 of the wire mesh.

Thus, the invention comprises, in the limited province of the filtration of particulate matter from combustion gases of a pyrotechnic or a hybrid inflator, the increase of the peripheral surface area of wire strands in metal wire mesh filters by mechanical abrading the strands of the wire mesh. Such increases enhance the filtering ability and the arresting of any harmful particles should they result from the combustion. Tests have shown that wire mesh having the outer surface of the strands of the woven, plain steel wire mesh mechanically roughened to increase the surface area of the strands produces enhanced filtration of particulate matter from inflation gas of inflator compared to the filtration achieved with the same woven wire mesh not having the outer peripheral surfaces of the strands mechanically roughened, i.e. compared to the smooth woven wire mesh previously used in inflator filter means. The mechanically roughened wire surfaces provided a reduction in the level of particulate residue from an inflator compared to the particulate residue level with unroughened, circular wire surfaces.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

I claim:

1. In an airbag assembly comprising an inflator housing including a combustion chamber for ignition of pyrotechnic gas-generating or ignition material therein, gas exhaust ports in said housing for discharge of inflation gas to an inflatable airbag, and metal wire mesh filter means intermediate the combustion chamber and the gas exhaust port for trapping any particulate matter present in the inflation gas produced upon combustion of the pyrotechnic gas-generating or ignition material, the improvement comprising:

strands of said metal wire mesh of said filter means have irregular, mechanically roughened peripheral surfaces for improved trapping of the particulate matter present in the inflation gas.

2. An airbag inflator as claimed in claim 1 wherein the irregular, mechanically roughened surfaces of the strands of wire mesh are mechanically abraded roughened surfaces.

3. An airbag inflator as claimed in claim 1 wherein the irregular, mechanically roughened surfaces of the strands of wire mesh are sandblasted surfaces.

4. An airbag inflator as claimed in claim 1 wherein the irregular, mechanically roughened surfaces of the strands of wire mesh are calendered surfaces.

5. An airbag inflator as claimed in claim 1 wherein the irregular, mechanically roughened surfaces of the strands of wire mesh are coined surfaces.

6. An airbag inflator as claimed in claim 1 wherein the irregular, mechanically roughened surfaces of the strands of wire mesh are knurled surfaces.

* * * * *